April 20, 1965 J. M. LUKER 3,179,036
BAKE PAN
Filed Feb. 6, 1962
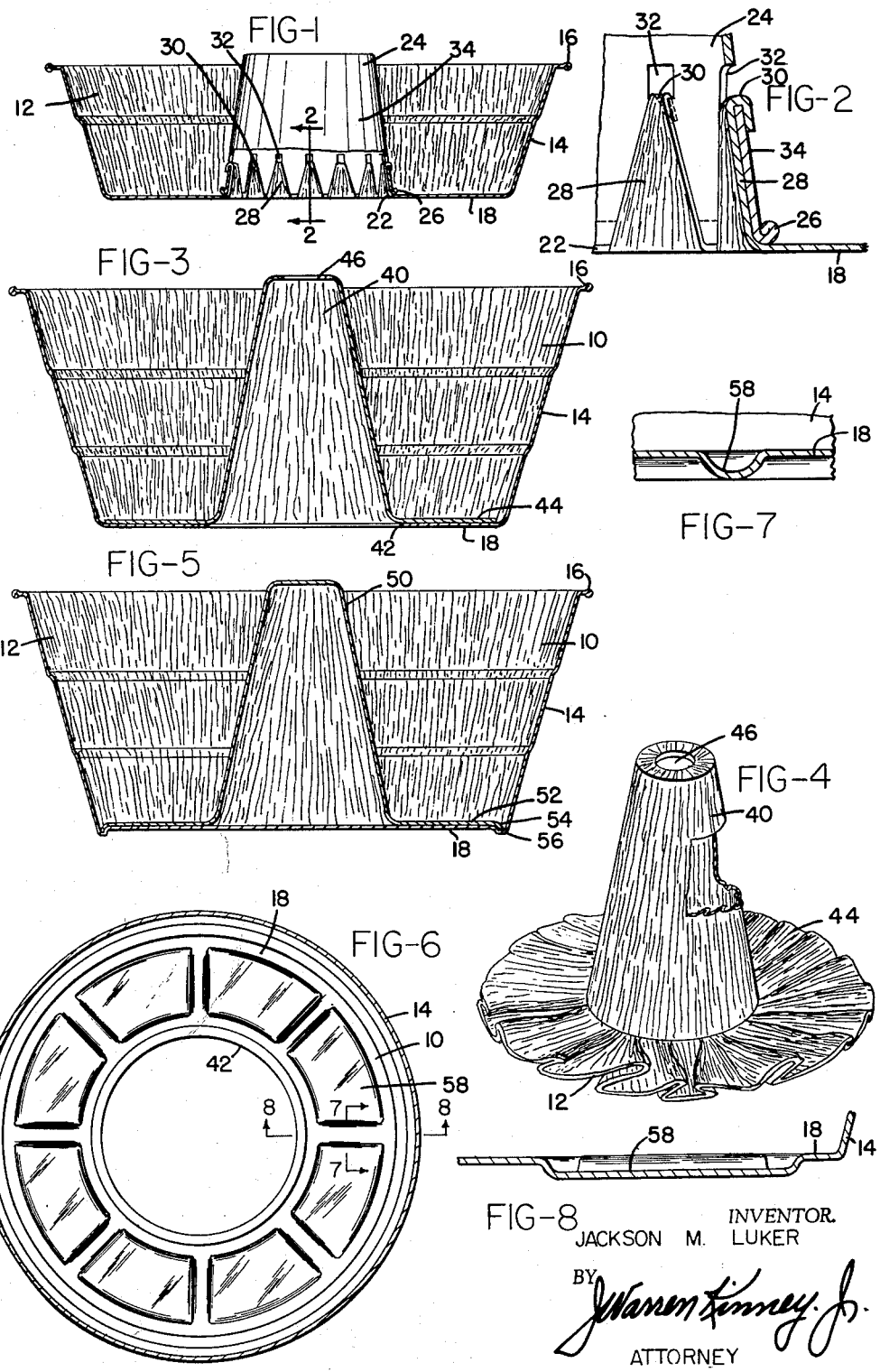
INVENTOR.
JACKSON M. LUKER
BY J. Warren Kinney Jr.
ATTORNEY

United States Patent Office 3,179,036
Patented Apr. 20, 1965

3,179,036
BAKE PAN
Jackson M. Luker, 207 E. Oregon St., Urbana, Ill.
Filed Feb. 6, 1962, Ser. No. 171,409
2 Claims. (Cl. 99—439)

This invention relates to a disposable cake pan, and is concerned particularly with pans of the type customarily used in the baking of angel food cakes. Such pans have deep sides and a central heat tube upstanding upon the pan bottom, and through which the oven heat may circulate during the baking process.

In the past, cake pans for the baking of angel food cakes have been constructed of heavy gauge deep drawn sheet metal, and were very expensive to manufacture. Damage to such pans and the loss thereof have been matters of great concern to the baker because of the expense involved.

Common practice has been to leave the cake in the pan after the baking process, and to transport the pan with the cake therein to the retailer who either removed the cake from the pan when selling it, or permitted the consumer to take possession of the pan when buying the cake, some arrangement being made for return of the pan to the retailer. In any event, the pan was subject to considerable handling, shipment, and abuse. The handling and shipment, including return of the pans to the bakery, involved considerable expense and the risk of damage or less of pans in transit.

An object of the present invention is to eliminate the aforesaid handling, shipment, and loss of expensive bake pans, by providing a form of pan which is simply and inexpensively produced, and which may accompany the cake from the bakery to the ultimate consumer who will dispose of the pan after use.

Another object is to provide a pan equipped with a central heat tube, which may be shipped to the bakery in knocked-down condition and assembled at the bakery with ease and despatch.

Another object is to provide a light-weight but durable disposable pan of the heat tube type, constructed of inexpensive metallic foil and a commercially available paper drinking cup used as a heat tube.

A further object is to provide a modification of the pan above mentioned, wherein a metallic foil is utilized throughout the pan construction, including the heat tube.

The foregoing and other objects are attained by the means described herein and illustrated upon the accompanying drawing, in which:

FIG. 1 is a vertical cross-section taken through the improved cake pan, part being shown in elevation.

FIG. 2 is an enlarged fragmental cross-section taken on line 2—2 of FIG. 1.

FIG. 3 is a vertical cross-section of a modification, involving a simplified form of heat tube.

FIG. 4 is a perspective view partly broken away, showing in detail the heat tube of FIG. 3.

FIG. 5 is a vertical cross-section of a second modification.

FIG. 6 is a horizontal cross-section of a pan looking down into same, with the heat tube structure removed.

FIG. 7 is an enlarged fragmental cross-sectional taken on line 7—7 of FIG. 6.

FIG. 8 is an enlarged fragmental cross-section taken on line 8—8 of FIG. 6.

The various drawing views are intended to depict a heat tube form of bake pan 10 formed from an initially flat sheet of aluminum foil, or a foil of some other appropriate flexible metal. In forming the flat sheet to produce the circular pan, the dies will necessarily produce wrinkles or small folds as indicated at 12 throughout the structure. Such wrinkles or folds may occur also in forming the heat tube from metallic foil, as indicated upon FIG. 4. The wrinkles or folds do not interfere with proper baking, and may even be considered advantageous for rigidifying the bake pan including the heat tube.

The pan in the various illustrations includes a deep upright side wall 14 bounded by an integral circumferential reinforcing rim 16, and a bottom wall 18 formed integrally with the side wall. The upper rim of the pan may be turned and beaded, or otherwise reinforced, for imparting stability to the rim as is usual.

In that form of the invention illustrated by FIGS. 1 and 2, the pan bottom 18 is provided with a substantially circular central aperture 22, over which is placed an inverted paper drinking cup 24 serving as a heat tube for the cake pan. The cup, if desired, may have both ends open for inducing circulation of oven heat therethrough.

Means are provided for securing the cup to the pan bottom, so that the rim 26 of the cup may form a seal against the pan bottom to retain the batter introduced into the pan about the cup or heat tube. Such securing means for the cup may comprise a series of tongues 28 formed incident to removal of material in establishing the central aperture 22, the tongues in the form of triangular tabs having the bases of the triangles disposed in a circle which defines the aperture 22. The tongues, therefore, may stand upright upon the pan bottom while the bases thereof define the aperture 22.

Each tongue is characterized by a slender free end 30 that forms the apex of the triangular shape of the tongue, said end 30 being bendable to hook formation as best illustrated by FIG. 2, for engaging an opening 32 in the side wall 34 of cup 24.

It should be understood that cup 24 has its side wall pierced at intervals to form the openings 32 equally spaced apart about the cup, the openings being all equidistant from the rim 26 of the cup, and within reach of the ends 30 of tongues 28. The number of side openings 32 in the cup should, of course, correspond with the number of anchor tongues 28 carried by the pan bottom, so that each tongue may be secured within an opening of the cup.

To assemble the structure of FIGS. 1 and 2, the several tongues 28 will be upstanding upon the pan bottom, with the tongue ends 30 pointed upwardly. Then the cup 24 in inverted condition is lowered over all the tongues, so that the tongue ends 30 appear at the openings 32, but inside the cup. At this stage, the rim 26 of the cup will abut the pan bottom 18, while at the same time encircling the bases of all the tongues 28. To complete the assembly, it is necessary only to project the tongue ends 30 through the openings and bend them over upon the outside surface of the cup, according to FIG. 2. The inverted paper cup thereby is secured to the pan bottom, and serves as a heat tube centrally of the bake pan.

Reference is now made to FIGS. 3 and 4 showing a modified form of pan wherein the heat tube 40 is formed from a sheet of metallic foil similar to that used in forming the pan body. The pan in this instance has a central circular aperture 42 formed in the bottom wall. The heat tube includes an outwardly directed planar base flange 44 which is normal to the axis of tube 40, and is dimensioned to substantially cover the bottom wall 18 of the pan.

The base flange 44 of the heat tube may be formed integrally therewith, from a single initially flat sheet of metallic foil subjected to a suitable forming die set; however, the base flange might properly be a separate part crimped or otherwise fastened to the lower end portion of the tube, if desired. The tube preferably is tapered as shown, and may have an opening 46 at its upper end to provide for circulation of oven heat through the tube.

FIG. 4 shows the heat tube structure made in one piece, and indicates the folds or wrinkles produced by the dies. The folds of base flange 44, shown exaggerated in extent, will in practice be flattened to a nearly smooth planar surface so as to effectively suport a cake batter poured thereon, without risk of the batter entering between the base flange and the bottom wall of the cake pan. That is, base flange 44 will rather flatly overlie the pan bottom as suggested by FIG. 3.

For the convenience of the baker, pans such as FIG. 3 shows, with the tube structure removed, may be shipped and supplied in a compact package due to nestability of the pan bodies. In a separate compact light-weight package the tube structures may be supplied in nested condition also. To prepare the pans for use, the baker need only drop a tube structure into the open top of the pan as suggested by FIG. 3, which places it in condition for reception of batter. As previously pointed out herein, the cake pan is a disposable item, and will therefore accompany the baked product from the oven to the ultimate consumer, the consumer disposing of the pan after removal of the baked product.

In the modification illustrated by FIG. 5, the tapered central heat tube 50 is shown provided with an integral base flange 52 quite similar to the base flange of FIG. 3, with the exception that base flange 52 is provided with a downwardly turned peripheral lip 54 designed to effect a seal with the pan bottom along the upright side wall of the pan. The pan bottom may have formed therein an annular groove 56, pressed into the material of the bottom wall, to receive lip 54 and produce a seal marginally of the pan side wall. The lip seal will effectively prevent leakage and loss of batter, and will assist in centering the heat tube 50 within the pen.

Although FIG. 5 illustrates a solid pan bottom with no central aperture communicating with the inside of tube 50, it should clearly be understood that the pan bottom of FIG. 5 might desirably be apertured centrally thereof as in FIG. 3. Also, the top of heat tube 50 might desirably be open to permit circulation of oven heat through the tube, as suggested by FIG. 3.

FIGS. 6, 7 and 8 indicate a preferred treatment of the pan bottom wall in each modification illustrated upon the drawing. The pan bottom may be pressed to form embossments 58 all about the pan bottom between the center opening and the pan side wall, for the purpose of imparting rigidity and minimizing sagging of the bottom wall under the weight of batter introduced into the pan. The embossments may be of any acceptable shape and size conducive to the performance of the function above stated.

In conclusion, it may be noted that cake baking pans constructed as herein disclosed are inexpensive and practical of use, with the decided advantage of making economically possible a single use and disposition of the pans. Such use of the disposable pan effects great savings for the baker, and relieves him of the labor and space requirements that were necessary in the handling, cleaning, and repairing of returned sheet metal rigid pans. The metallic foil used in producing the pan bodies and heat tube structures may be obtained in various gauge thicknesses, and at very low cost. Aluminum foil of .002 to .005 inch thickness is found quite satisfactory in the practice of the present invention, although foils of other metals and of different thicknesses may be employed.

It is to be understood that various modifications and changes may be made in the structural details of the device, within the scope of the appended claims, without departing from the spirit of the invention.

What is claimed is:

1. The new combination consisting of a metal foil bake pan body and a paper heat tube, wherein the pan body has an upstanding side wall and a bottom wall, said bottom wall having a circular central opening therein and being plane between the side wall thereof and the edge of said opening, the material of the bottom wall being continued from the edge of said opening in a plurality of long tapering bendable upstanding tongues having free upper ends, the said paper heat tube being in the form of a drinking cup having a side wall terminating in a smooth annular uninterrupted rim, the cup being in inverted position over said opening with said rim resting upon the top surface of said bottom wall in encircling relationship with said tongues, the cup having a circular series of openings in the wall thereof corresponding in number to said tongues, each of said tongues lying against the inner side of said cup side wall and having its free end extended through one of said openings in the cup side wall and terminating in a bent portion positioned against the outer side of the cup wall to lock the cup in position on the pan bottom wall, and each of said openings being so spaced from the said rim of the cup and from the bottom part of the adjacent tongue and of such size with respect to the adjacent free end of the tongue as to permit the said free end of the tongue to be pressed through the opening and to be bent to the said position against the outer side of the cup wall following the placing of the cup in the said inverted position over the opening.

2. A bake pan comprising the new combination of a metallic foil pan body and a heat tube of paper, the metallic foil pan body being formed to provide an upstanding side wall and a bottom wall, the said bottom wall having a circular central opening therein, and being plane between said side wall and the edge of said openings, the material of the bottom wall being continued from the edge of said opening in a plurality of relatively long bendable upstanding triangular tongues terminating in apical upper end portions, said paper heat tube being in the form of a drinking cup having a side wall terminating in a smooth, annular uninterrupted rim, the cup being disposed in inverted position over said opening with said rim resting upon the top surface of said bottom wall in encircling relationship with and engaging the bottom portions of the tongues in the angle between said bottom portions of the tongues and the bottom wall of the pan body, the cup having a circular series of openings in the wall thereof corresponding in number to said tongues, each of said tongues extending upwardly into the cup against the inner surface of the cup side wall and having its free end portion extended through one of said openings in the cup wall and then extending downwardly against the outer side of the cup wall to lock the cup in position on the pan bottom wall, and the said openings being spaced from the cup rim such that each has a lower edge located a distance from the rim slightly less than the length of the adjacent tongue and has a top edge so positioned above the end portion of the tongue whereby to permit such end portion to be projected therethrough and be bent to the said downwardly extending position.

References Cited by the Examiner

UNITED STATES PATENTS

| | | | |
|---|---|---|---|
| 557,685 | 4/96 | Mains. | |
| 1,505,999 | 8/24 | Gereke. | |
| 1,713,577 | 5/29 | Wentorf | 99—439 X |
| 1,852,966 | 4/32 | Green | 99—439 |
| 2,391,767 | 12/45 | Beerend | 99—438 |
| 2,669,914 | 2/54 | Swaine. | |
| 2,759,656 | 8/56 | Abrams. | |
| 2,960,218 | 11/60 | Cheeley | 99—439 X |
| 3,033,101 | 5/62 | Meyers | 99—439 |

ROBERT E. PULFREY, Primary Examiner.

JEROME SCHNALL, Examiner.